(12) United States Patent
Zhang

(10) Patent No.: US 9,104,810 B2
(45) Date of Patent: Aug. 11, 2015

(54) CREATING A TEST CASE

(75) Inventor: Yan Zhang, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 14/001,723

(22) PCT Filed: Mar. 8, 2011

(86) PCT No.: PCT/CN2011/000368
§ 371 (c)(1),
(2), (4) Date: Aug. 27, 2013

(87) PCT Pub. No.: WO2012/119267
PCT Pub. Date: Sep. 13, 2012

(65) Prior Publication Data
US 2013/0346948 A1 Dec. 26, 2013

(51) Int. Cl.
*G06F 9/44* (2006.01)
*G06F 11/36* (2006.01)

(52) U.S. Cl.
CPC .......... *G06F 11/3684* (2013.01); *G06F 11/362* (2013.01); *G06F 11/3668* (2013.01); *G06F 11/3672* (2013.01); *G06F 11/3696* (2013.01)

(58) Field of Classification Search
CPC ....................................... G06F 11/36–11/3696
See application file for complete search history.

(56) References Cited

U.S. PATENT DOCUMENTS 7,917,895 B2 * 3/2011 Givoni et al. ................. 717/124
8,701,092 B1 * 4/2014 Colcord ........................ 717/127
2003/0084429 A1 * 5/2003 Schaefer ........................ 717/125
2005/0166094 A1 * 7/2005 Blackwell et al. .............. 714/38
2005/0204201 A1 * 9/2005 Meenakshisundaram et al. ............................... 714/38
2007/0005300 A1 * 1/2007 Haggerty et al. ............. 702/183
2007/0022407 A1 * 1/2007 Givoni et al. ................. 717/124
2007/0220341 A1 * 9/2007 Apostoloiu et al. ........... 714/33
2008/0082968 A1 * 4/2008 Chang et al. .................. 717/128
2008/0115114 A1 * 5/2008 Palaparthi et al. ............ 717/128
2008/0184206 A1 * 7/2008 Vikutan ........................ 717/127
2009/0019427 A1 * 1/2009 Li et al. ........................ 717/126
2009/0300585 A1 * 12/2009 Meenakshisundaram et al. ............................ 717/124

(Continued)

FOREIGN PATENT DOCUMENTS

CN 101025686 A 8/2007
CN 101571797 A 11/2009

OTHER PUBLICATIONS

Kung, David C., et al., "An Object-Oriented Web Test Model for Testing Web Applications", 2000, pp. 111-120.*

(Continued)

*Primary Examiner* — Thuy Dao
*Assistant Examiner* — Christopher Franco
(74) *Attorney, Agent, or Firm* — Thorpe, North & Western L.L.P.

(57) ABSTRACT

A method for creating as test case for a client can include identifying an object in the client using a parser module. A list of potential test case tasks for testing the client can be populated from the parser module into a test case task window. A test case flow can be built by placing a desired task from the list of potential test case tasks in a test case development window. The method can continue by assigning the object to the desired task in the test case development window. The test case can be generated from the test case flow.

20 Claims, 11 Drawing Sheets

(56) References Cited

U.S. PATENT DOCUMENTS

2010/0088677 A1* 4/2010 Li et al. .......................... 717/124
2011/0083120 A1* 4/2011 Bhandar et al. ............... 717/121

OTHER PUBLICATIONS

Korel, Bogdan, "Automated Software Test Data Generation", 1990, pp. 870-879.*

Bai, Xiaoying, et al., "WSDL-Based Automatic Test Case Generation for Web Services Testing", 2005, pp. 1-6.*

Tracey, Nigel, et al., "An Automated Framework for Structural Test-Data Generation", 1998, pp. 1-4.*

Arantes, Alessandro Oliveira, et al. "Tool support for generating model-based test cases via web", 2014, pp. 62-96.*

Bansal, Priti, et al., "A model based approach to test case generation for testing the navigation behavior of dynamic web applications", 2013, pp. 213-218.*

The State Intellectual Property Office, The P.R. China, International Search Report and Written Opinion, Dec. 15, 2011, 11 pages, Beijing, China.

* cited by examiner

```
<?xml version="1.0"?>
<!--This is a test case xml style document!-->
<Flow version="" name="StandardFlowXML" code="" description="" product="AssetManager">
    <Controls>
        <Page category="wizard" pagename="pgCreateBTOLicense" service="SAM4BTO" strsqlname="sysSamHPBTOCreateLicense">
            <Control strcontrolname="Form" enumcontroltag="0" enumformcategory="2" enumnodecategory="-842150451" strformcategory="wizard" strformid="detail" strnodeclass="" strnodeid="" strnodetype="" strtdsnodeclass="FC_FORM" hasoptions="0" options=""/>
            ...
    </Controls>
    <FlowGraph name="Flow">
        <FlowStart name="Start" code="000" description="Start" rect="-805 1215 -741 1191">
            <Inputs/>
            <Outputs>
                <Output name="000" input="1" _id="2"/>
            </Outputs>
        </FlowStart>
        <ImportFixture name="ImportFixture" code="" description="ImportFixture" rect="-617 1170 -467 1214" style="10">
            <Inputs>
                <Input name="" _id="1"/>
            </Inputs>
            <Outputs>
                <Output name="Next Step" input="3" _id="4"/>
            </Outputs>
            <HandleEvents>
                <HandleEvent code="001" name="Next Step" output="4"/>
            </HandleEvents>
            <Actions>
                <Import>
                    <Table name="amCable" comments="amcable" itemcount="2" columncount="2">
                        <Fields>
                            <Field name="Code"/>
                            <Field name="Label"/>
                        </Fields>
                        <Record>
                            <Column value="code1"/>
                            <Column value="label1"/>
                        </Record>
                        <Record>
                            <Column value="code2"/>
                            <Column value="label2"/>
                        </Record>
                    </Table>
                    <Action name="save" alias="amCable" class="">
                        <Parameter name="param1" value=""/>
                        <Parameter name="param2" value=""/>
                        <Parameter name="param3" value=""/>
                        <Parameter name="param4" value=""/>
                    </Action>
                </Import>
            </Actions>
        </ImportFixture>
        ...
        <FlowStop name="Stop" code="999" description="Stop" rect="-111 1108 -47 1084">
            <Inputs>
                <Input name="" _id="9"/>
            </Inputs>
            <Outputs>
            </Outputs>
        </FlowStop>
    </FlowGraph></Flow>
```

FIG. 8

CREATING A TEST CASE

CROSS-REFERENCE TO RELATED APPLICATION

This application is a national stage application under 35 U.S.C. §371 of PCT/CN2011/000368, filed Mar. 8, 2011.

BACKGROUND

A test case in software engineering is a set of conditions or variables used by a tester to determine whether an application or software system is working correctly. Designing test cases can be a time consuming part of daily work for a test writer. A common approach for designing test at is manually coding to prepare an input and expected output as well as making decisions as to whether or not the functions provided by a test framework are appropriate for selected objects. Current methods of designing test cases, as well as maintaining such test cases, can be time-consuming, expensive, and inconvenient.

Many products provide, as database and test framework. Test writers typically develop test cases and run the test cases on the test framework provided. As described above, writing test cases can be a very time consuming job. In addition to the task of writing the actual test case, a test writer generally spend time learning and understanding a context in which the test case be used. The context can be very complex and difficult to completely grasp. Currently, test case designing can result in low productivities and performance for test writers.

A basic procedure for writing as test case may include at least some of the following tasks. The test case writer may manually identify objects in as web application. The test case writer may also spend time becoming familiar with objects, functionality of the objects, database oak made by the objects, and the databases which are called by the objects. The test case writer may prepare testing data based on the test case writer's understanding of the database schema. The test case writer can write a computer readable code defining functions available from at provided test framework, and these functions may then be combined according to an execution sequence. Once the test case has been finalized, the test case can be placed into the test framework environment to test software functionalities. Analysis of a system to be tested and design of the test code can be complex and difficult. Maintenance or updating of test cases can provide additional complexity and difficulty.

BRIEF DESCRIPTION OF THE DRAWINGS

FIG. 5 is a screenshot of a table import window for a flow-builder tool in accordance with an example of the present technology;

FIG. 7 is a display of a preview of a test case generated in accordance with an example of the present technology;

FIG. 8 is an XML flow of a test case in accordance with an example of the present technology.

DETAILED DESCRIPTION

Figure 1:
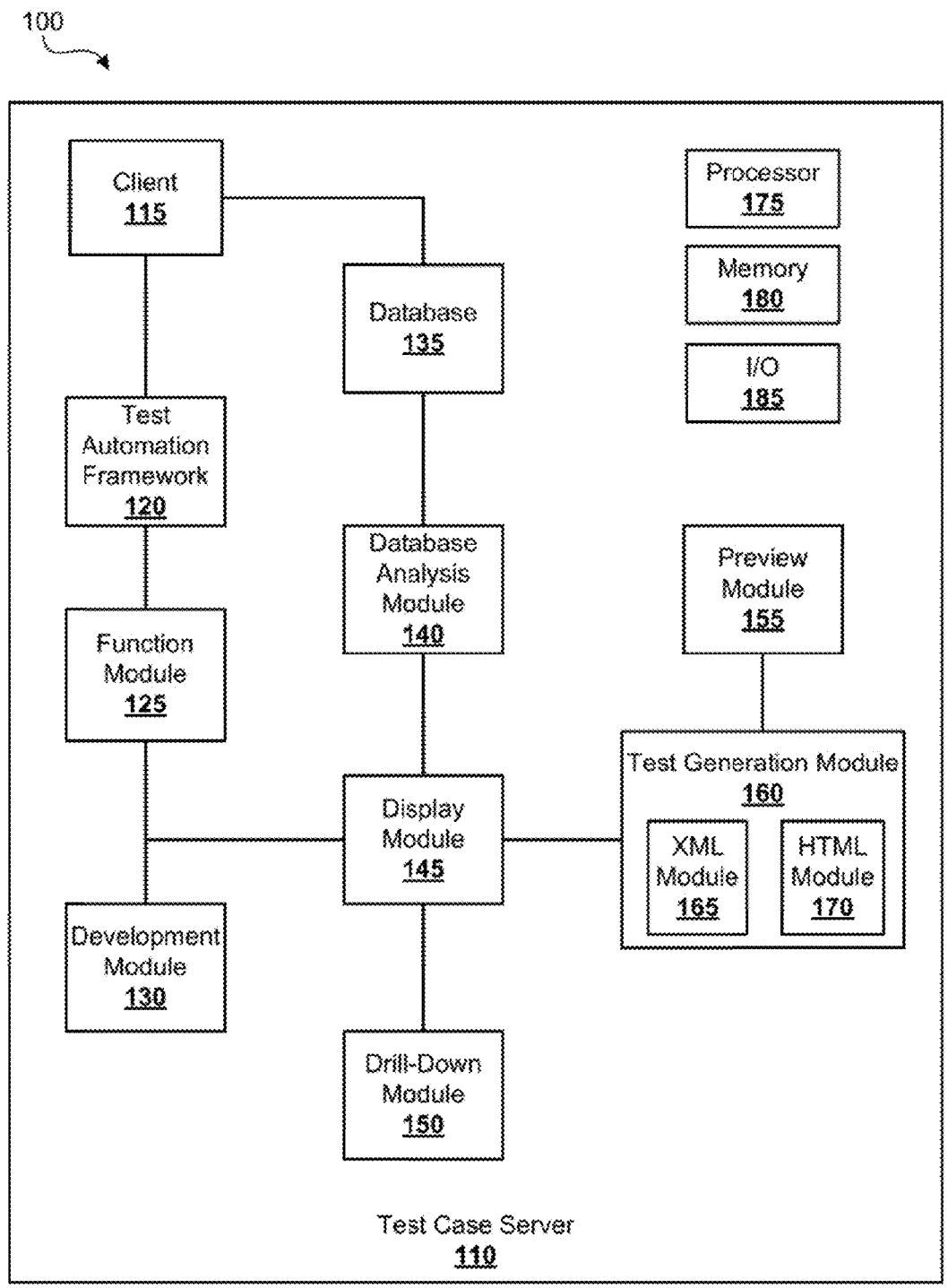
FIG. 1 is a block diagram of a system for creating a test case in accordance with an example of the present technology.

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

A test case in software engineering is a set of conditions or variables under which a tester will determine whether an application or software system is working correctly. Designing test cases can be a time consuming part of daily work for a test writer. A common approach for designing test cases is coding manually to prepare inputs, identifying expected outputs, and determining whether functions provided by a test automation framework are appropriate for selected objects in a client, such as a we client for example. The present technology can be used by test writers to simplify test case design and maintenance using a flexible integrated development environment (IDE). For example, the technology can be used to identify objects in a web application for a client, design a test automation framework, analyze database schemas to help prepare inputs, and provide a workflow engine to support transfer of data between test case steps. The technology can improve productivity and efficiency of test case writers.

An example method for creating a test case for a client can include identifying an object in the client using a HyperText Markup Language (HTML) parser module. A list of potential test as functions or tasks for testing the client can be populated from the test automation framework into a test case task window. A test case flow can be built by placing a desired task from the list of potential test case tasks in a test case development window. The method can continue by drilling down into the desired task to assign the object to the desired task in the test case development window. The test case can be generated from the test case flow.

To write a test case, test writers become familiar with a context of the client or web application. A typical method of writing a test case uses a basic text editor application by which the test case writer writes the test case. The test case writer may attempt to identify objects in the web application and may further prepare testing data based on a database schema used by the testing application. The test case writer can also code various functions available through the test automation framework into the test case according to a desired executing sequence. The text editor can be used to finalize the test cases before placing the test cases into the test automation framework.

Although many third-party tools can help test writers to identify objects in a web application, the tools do not work well with a test automation framework. Also, the tools generally do not analyze database schemas. As a result, the complexity of preparing and maintaining test case coding manually can be complex and stressful.

In contrast, the technology for creating test cases herein can be integrated with existing product development environments, including database schemas and test automation frameworks. The technology can be used to automatically identify objects in a web application, automatically analyze database schemas, identify appropriate functions for objects in the web application, and be used to design test cases with a graphical user interface (GUI) tool such as by drag-and-drop, for example). A work flow engine can be used to support the test case transfer between steps of the test case.

Referring to FIG. 1, a system 100 is shown for creating a test case for a client 115 in accordance with an example. The system can include as test automation framework 120 on a test case server 110, the test automation framework 120 having various functions or tasks for testing the client. The test automation framework 120 can identify and analyze the functions using a function module 125 to build relationships between objects in the client and the functions. In one aspect, the function module can be an HTML parser module. To narrow a set of functions for specific objects, the test automation framework 120 can use mapping rules based on categories of objects. When test writers select specific objects while designing a test case, as is described further below, related test functions or tasks can be listed and displayed in a GUI pop-up window. The flow builder can also fill parameter values for some functions to reduce the amount of input from the test writer. For example, some functions may only use a particular parameter value in combination with a specific object and auto population of the value can save the time and effort of the test writer.

Function module 125 can also be used to identify objects in the client. The function module 125 can populate the functions into a test case function window. The technology can automatically analyze a web application or client 115 and gather objects and relevant information about the objects. For example, the relevant information may include object name, class, and so forth. The technology can also enable manual input or identification of objects. For example, a test writer may wish to manually input objects into a test case where a web application is not yet working or where a web application has not yet been developed.

The system 100 can include a database analysis module 140. The database analysis module can identify a database 135 used by the client or web application. The database analysis module can further read a schema of the database, as well as analyze a table definition and any links to another table within the database. The database analysis module can display a hierarchical graphical display of database elements in a user interface for use in building the test case flow as a result of the analysis of the database. The hierarchical graphical display can include elements such as normal fields, structure (one to one links), and collections (one to many links). Using the database analysis module, a test case writer can easily prepare testing data for multiple tables at once.

The system 100 can include a development module 130. The development module 130 can enable building a test case flow by placing a desired function from the various available functions in a test case development window. The test case development window can use a display module 145 to provide a GUI by which test writers can select objects or functions and put the objects or functions in a container via a drag and drop interface. The GUI can provide arrows and/or lines between objects or functions dragged and dropped into the interface. For example, the arrows or lines can identify an execution order of the functions, or an association of functions or objects.

The system 100 can include a drill down module 150. The drill down module 150 can enable drilling down into a desired function to assign in object to the desired function in the test case development window. For example, by double-clicking a mouse on an object or function, a test case writer can drill down into properties of the object or function to define properties or behaviors.

The system 100 can include a preview module 155. The preview module can provide optional preview functionality to the test writer. For example, when selected by a test writer, the preview module can display as preview of the test case before generating the test case from the test case flow. Thus, the preview module can enable the test writer to preview the test case and identify potential issues before the test case is generated. For example, previewing the test case can assist the test writer in verifying a layout of the test case or adjusting a style of the test case. The preview module can also check grammar for each function and availability of an input function value. Checking the grammar and input values can help avoid dead loops in the final, test case.

The system 100 can include a generation module 160. The generation module can generate the test case from the test case flow built using the development module 130. The generation module can include a hypertext markup language (HTML) module 170 and/or an extensible markup language (XML) module 165. The HTML module can generate the test case in an HTML format. The XML module can generate the test case with related information in an XML format. The final test case output refers to a working test case. The test case can be placed into the test automation framework environment in which the test case is performed, and from which testing results can be generated.

The generation module can include a work flow engine or processor for generating the movement from one step to the next within the test case flow. For example, the work now engine can move to the next step after a previous step has been completed under predefined conditions.

The generation module can further be configured to maintain entire contexts of test cases designed. For example, the context can be kept in an XML file and can be reloaded as desired for editing, reviewing, and so forth.

The system 100 can further include a processor 175, memory 180, I/O buses 185, and other components for use by the various modules in performing the described functionality of the modules. In one aspect, the memory 180 can include program instructions that when executed by the processor 175 function as the modules described above. In one aspect, the program instructions can take the form of an installation package which when installed and executed by the processor functions as the modules described. The memory may comprise one or more of random access memory (RAM), read only memory (ROM), a compact disc (CD), a digital video disc (DVD), a hard disk drive (HDD), a solid state drive, (SSD), and so forth.

The described system 100 can allow for integration with existing database schemas, existing test automation frameworks, and provide for object analysis and test case preview. The system can provide substantial time and cost savings for test writers. For example, a test case design which may otherwise take a test writer as much as a week to prepare can be designed using the system within a single day.

Figure 2:
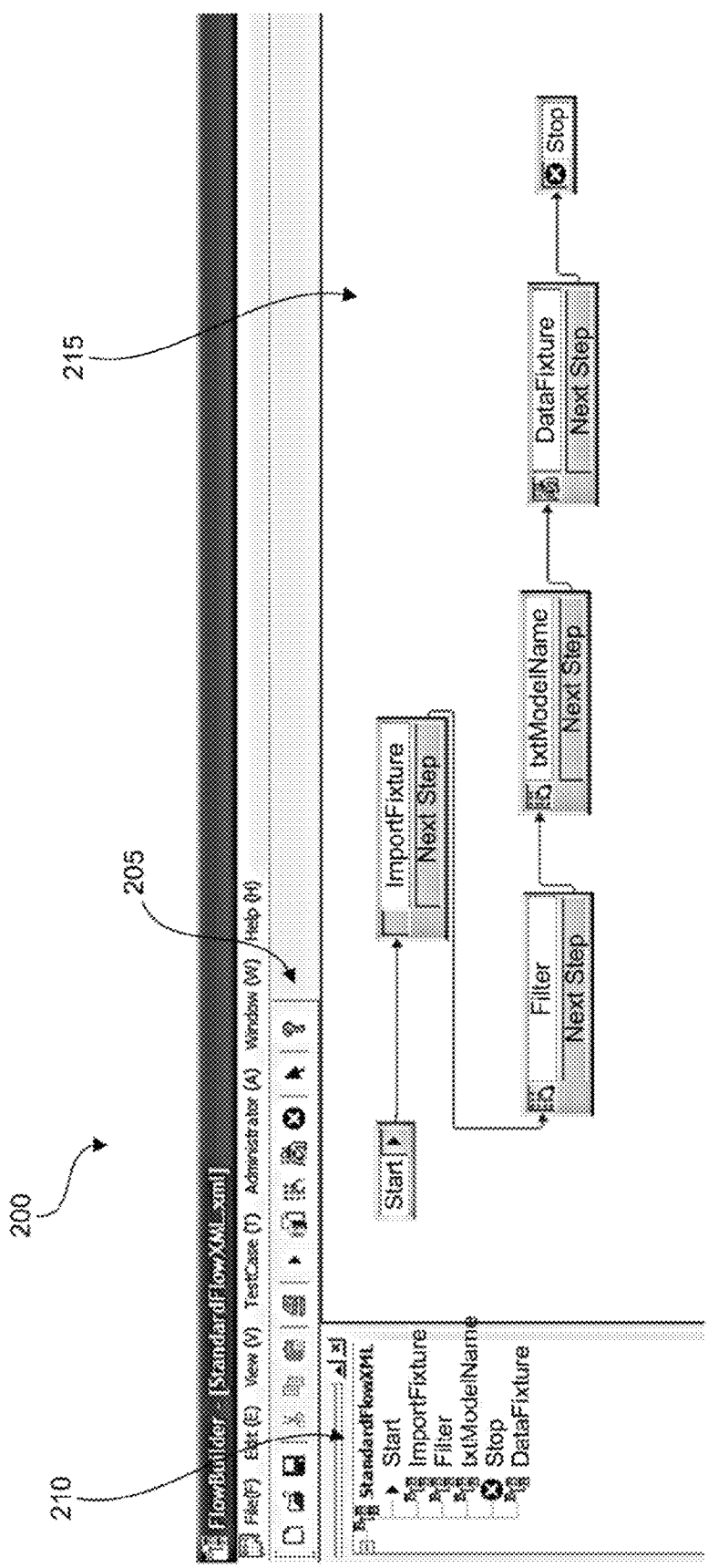
FIG. 2 is a screenshot of a flow-builder tool for creating a test case in accordance with an example of the present technology.

Referring now to FIG. 2, a flow builder diagram 200 is illustrated for building as test case workflow using a drag and drop interface. A tool bar 205 earn provide useful task designing, tools, such as START, STOP, Import, Client, and Data. A task is a set of actions on a specific object or function. A task window 210 can list tasks involved in a workflow. A workflow may typically be composed of many tasks and each task may be associated with as specific object or function and assign a related action to the object or function. A flow window 215 can be provided to add new tasks by selecting objects and setting related actions accordingly. The newly added tasks can also be displayed in task window 210.

The test writer can begin by dragging as Start task from tool bar into the flow window. As shown in FIG. 2, various other tasks can be dragged into the flow window, such as Import and Data, among others. Once the flow has been created with the desired functions, the test writer can drag a STOP task into the flow window. The tasks can be connected by lines or arrows which indicate an order of execution of the tasks. Thus, a test writer can easily visualize a progression of the test case flow from start to finish, including the various intervening functions.

Figure 3:
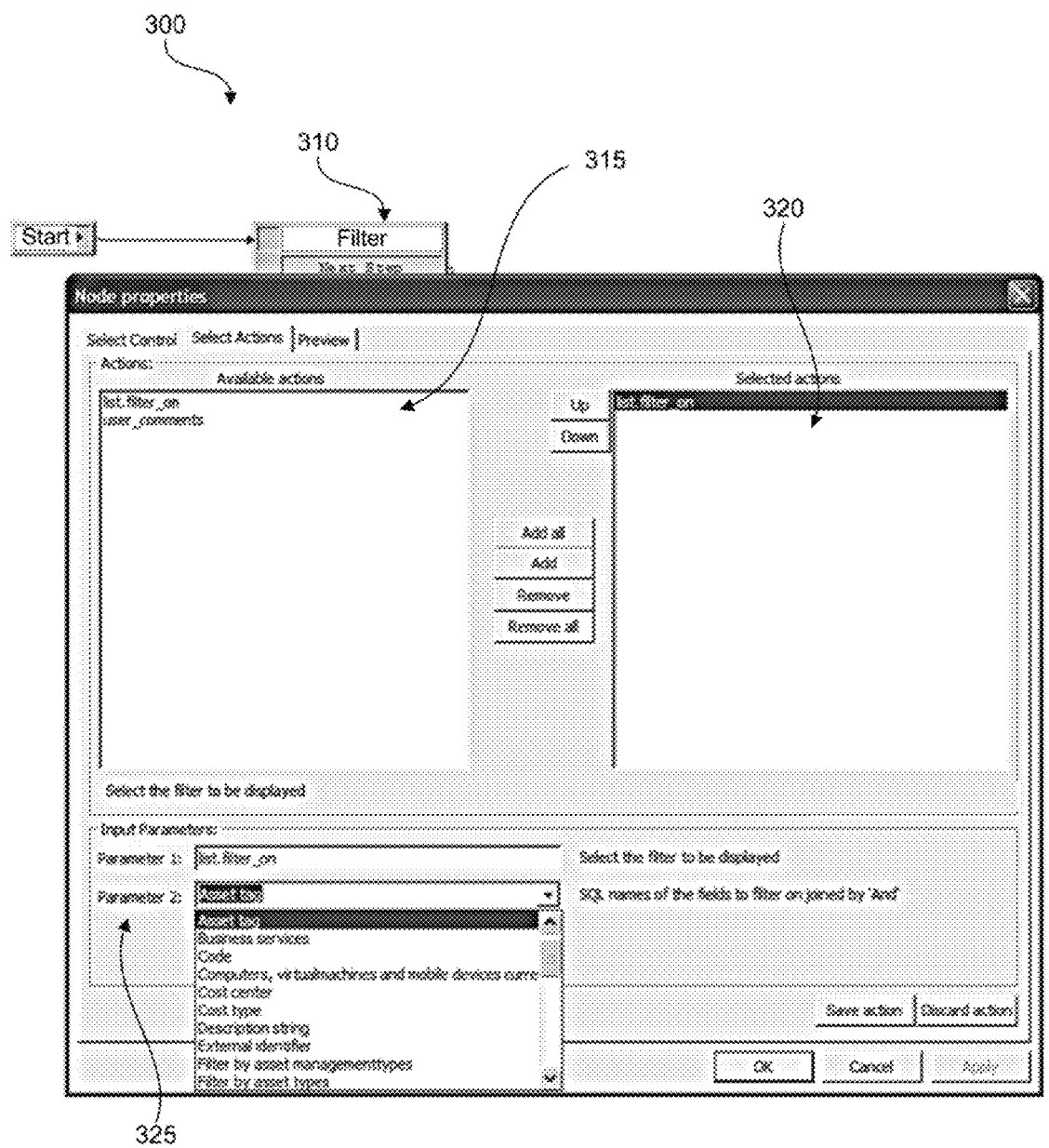
FIGS. 3-4 are screenshots of drill-down into as test case flow in accordance with an example of the present technology.

FIG. 3 depicts a drill-down diagram 300 from a filter function 310 of a flow in a flow builder. The Chill-down window enables the test writer to set properties for a specific control or function. An available actions window 315 further allows the test writer to select related actions to add to the function. Selected actions can be listed in a selected actions window 320. Parameters for the function or the related action can also be input in a parameter input window 325. As described above, some parameters can be filled automatically, or in advance. FIG. 3 illustrates test writer selection of the second parameter from a drop-down list. The content of the drop-down list can be gathered from the web application via the HTML parser module/function module.

Figure 4:
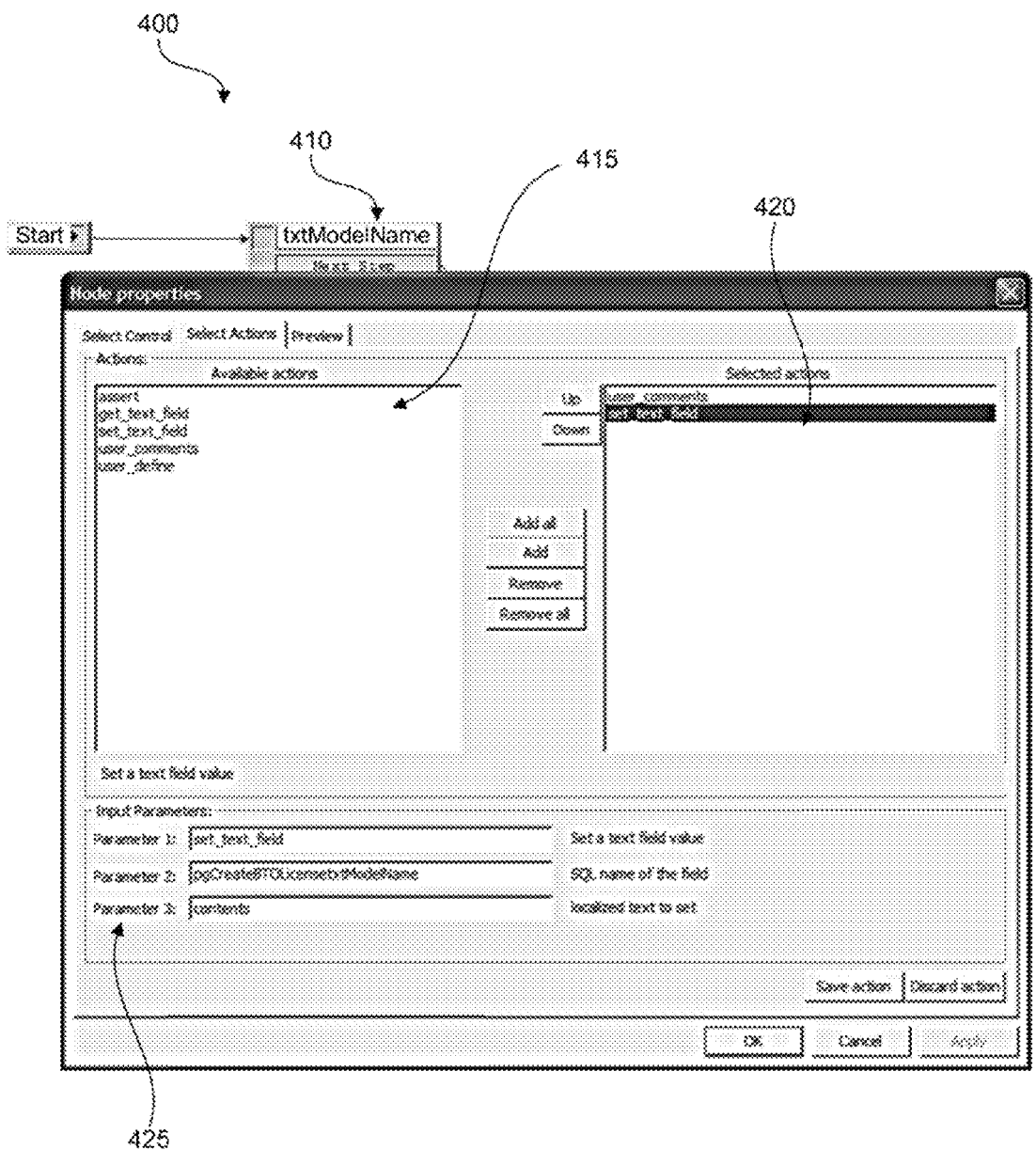

FIG. 4 illustrates another drill-down diagram 400 from the text field function 410 of a flow in a flow builder. This drill-down window allows the test writer to set properties for a text box control. For example, a list of available actions 415 can be provided. A user can select desired actions and add the actions to a selected actions list 420. Parameters for the actions can be set at the input parameters field 425. In this example. Parameter 1 is a command name, Parameter 2 is as name of the control field, which was identified automatically, and Parameter 3 is an input parameter.

As described above, the flow builder can analyze and import, database information. FIG. 5 shows a drill-down diagram from an import function of flow in a flow builder. More specifically, FIG. 5 illustrates preparation of testing data. The test writer can select a table from a list of available tables 510 from which to operate. The selected table can be added to a selected table window 515. A field from the selected table can then be selected in a select fields window 520. The drill-down window can enable the test writer to input values for each field in as field input window 525. The field input window can include a list of various inputs or parameters for the selected field.

Figure 6:
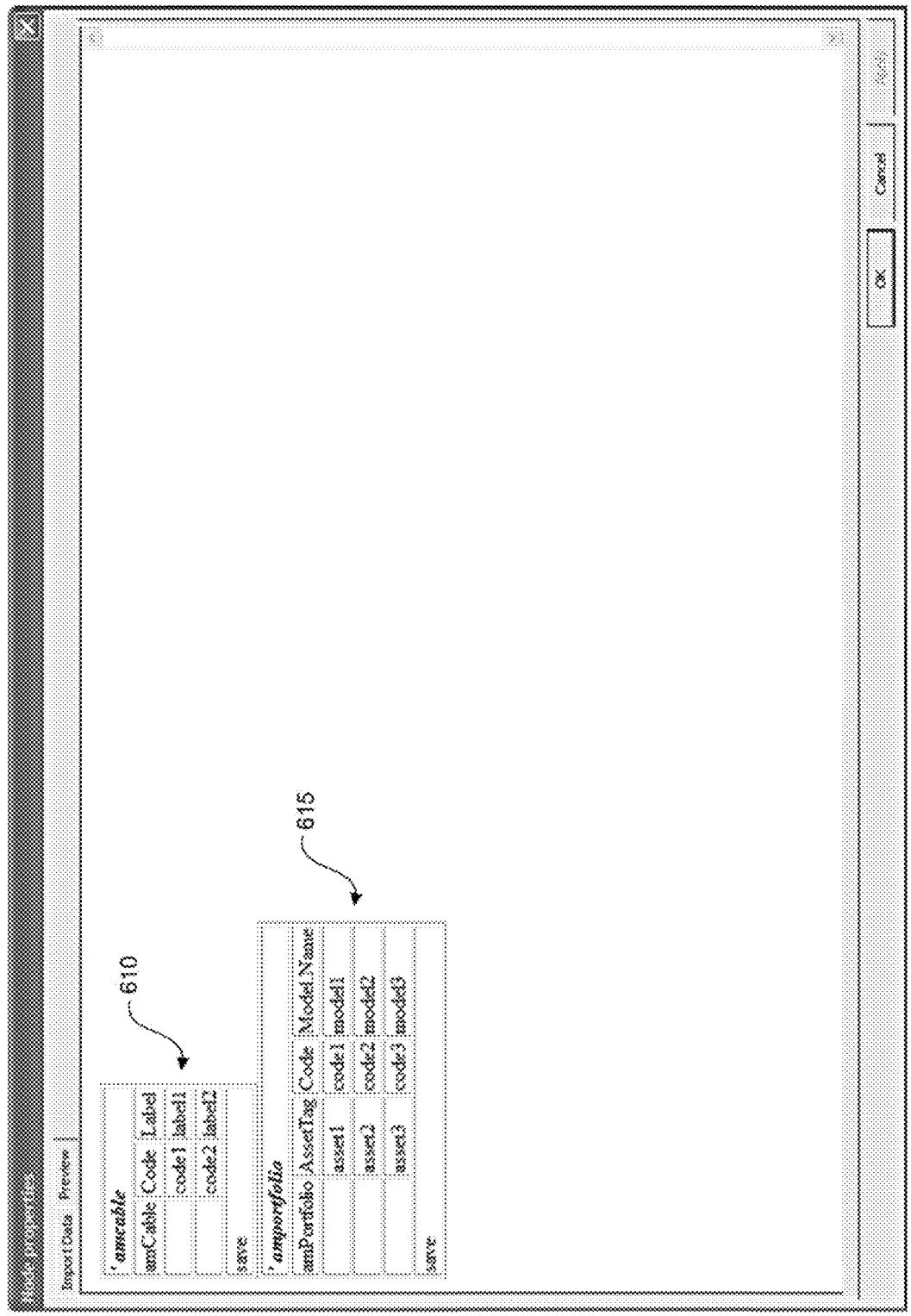
FIG. 6 is a display of a preview of a table import in accordance with an example of the present technology.

After the data to be imported has been defined and configured as described above regarding FIG. 5, the system cat allow the use to preview the testing data. FIG. 6 illustrates a preview of the data imported from the amCable 610 and amPortfolio 615 tables in the database. Thus, the test writer can determine whether the tables and data have been correctly identified, imported, configured, etc.

Figure 7:
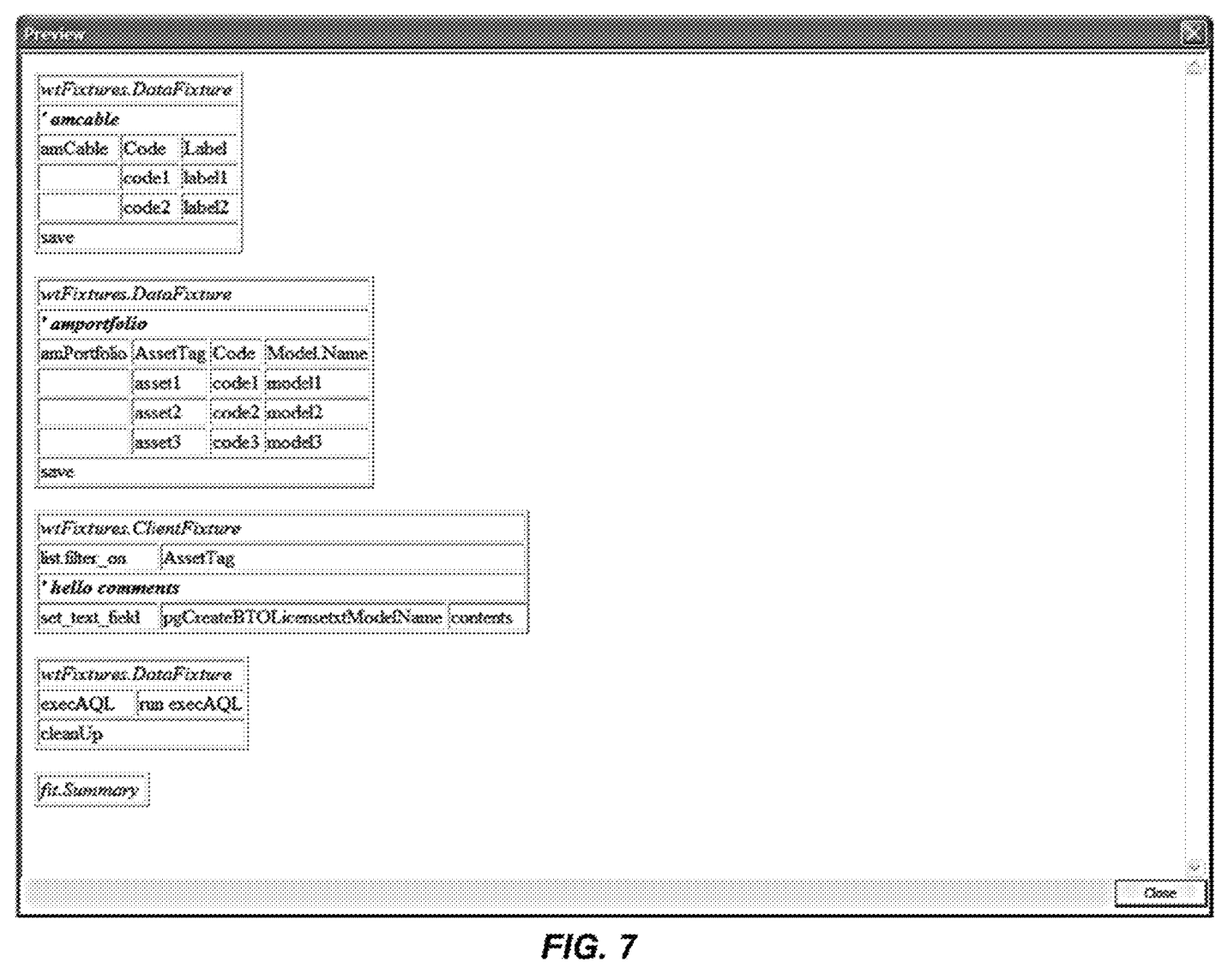

FIG. 7 illustrates a preview of an entire test case. The preview can be generated using the preview module and displayed using the display module. The preview of the test case can be generated from the test case work flow defined in the flow builder window of FIG. 2.

The test case preview can be similar to the HTML output test case described above. The system can also output an XML document of the test case which includes context information in addition to what is included in the HTML output. More specifically, the XML document can hold both the content and the context of the workflow. The XML document can include controls, workflow, and functions. The XML document can be reloaded into a test case flow design studio to enable modification of the workflow without re-identifying the controls from the web application. An example excerpted XML flow for the test case previewed in FIG. 7 is shown in FIG. 8 (the " . . . " indicates redacted portions).

Figure 9:
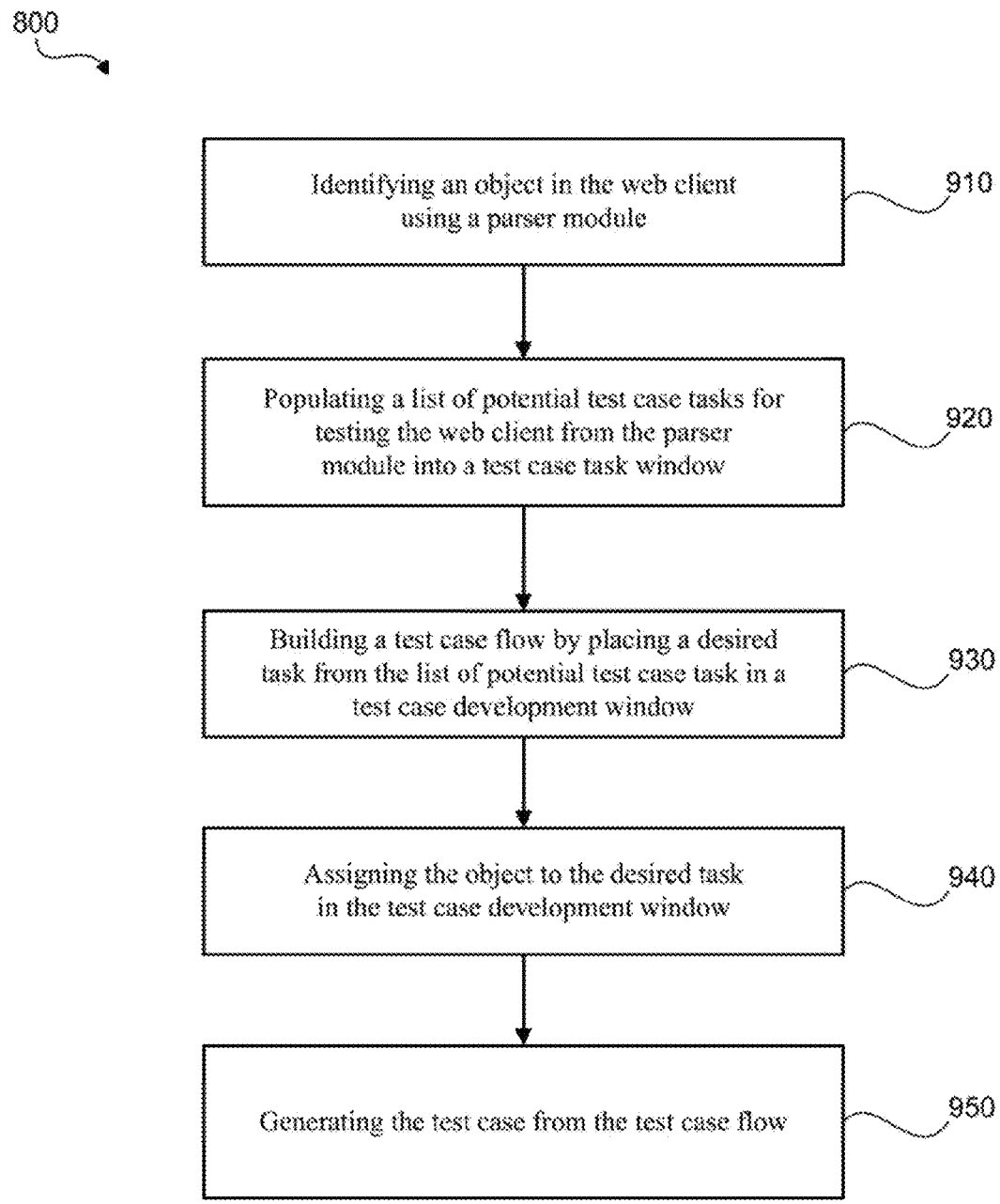
FIGS. 9-10 are flow diagrams of methods for creating as test case for a client in accordance with examples of the present technology.

Referring to FIG. 9, a flow diagram of a method 900 is shown for creating a test case for a client. The method can include identifying 910 an object in the client or web application using a function module, such a parser module, or more specifically an HTML parser module. A list of potential test case functions for testing the client can be populated 920 from the HTML parser module into as test case task window. The method can also include identifying a database used by the client, reading a schema of the database, and/or analyzing a table definition and any links to another table within the database. In addition, the method can display a hierarchical graphical display of database elements in a user interface for use in building the test case flow.

A test case flow can be built 930 by placing a desired task from the list of potential test case tasks in a test case development window. For example, as user can place the desired task in the test case development window by dragging and dropping the desired task from the test case function window into the test case development window. The desired task can be one or more of any of a variety of tasks. One or more of the tasks can be assignable to the object.

The user can drill down into or otherwise select the desired task to assign 940 the object to the desired task in the test case development window. The method can also include assigning an input value to at least one of the tasks for input into the client for the test case. For example, assigning an input value may include assigning a data manipulation to at least one of the tasks to manipulate data in a database used by the client. The test case can be generated 950 from the test case flow. In one example, the test case can be generated as a hyper text markup language (HTML) test case document containing HTML commands for the client based on the desired task. In another example, the test case can be generated as an XML (extended markup language) document comprising the HTML commands, the desired function, and an identification of the object. The user may wish to preview the test case before generating the HTML or XML output for into any other desirable formats, high level languages, etc.). Accordingly, the method in include selectively displaying a preview of the test case before generating the test case from the test case flow to enable it user to preview the test case and identify potential issues before the Lest case is generated.

Figure 10:
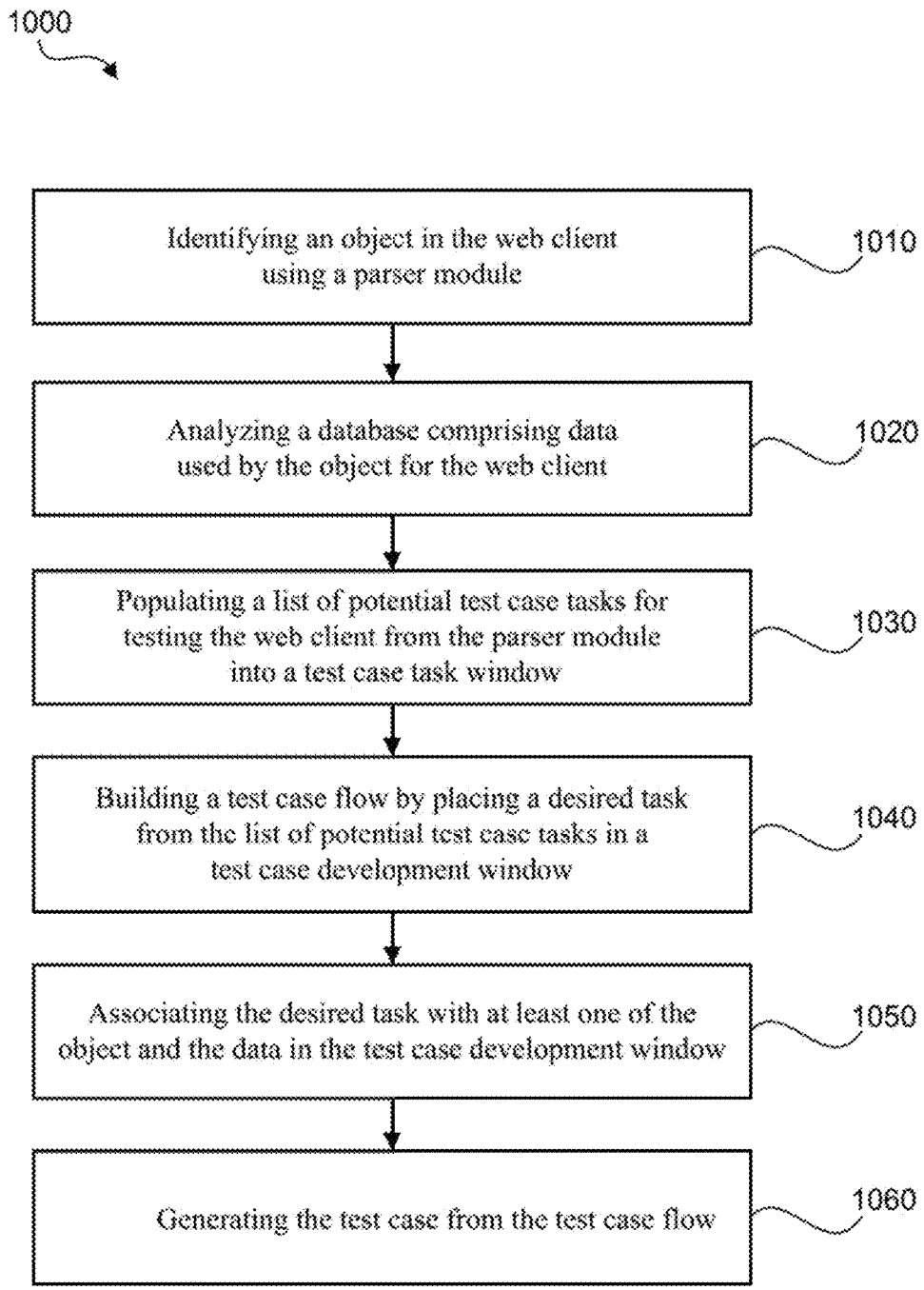

FIG. 10 illustrates a flow diagram of another method 1000 for creating a test case for a clients method can include identifying 1010 an object in the client using a parser module/function module. An HTML parser is one example of a parser module, but other types of parser modules may also be used. A database for the client having data used by the object can be analyzed 1020. A list of potential test case tasks for testing the client can be populated 1030 from the HTML parser module into a test case task window. A test case flow can be built 1040 by placing a desired task from the list of potential test case tasks in a test case development window. By drilling down or otherwise selecting the desired task, functionality, actions, or associations for the desired task can be applied 1050 to at least one of the object and the data in the test case development window. The test case can then be generated 1060 from the test case flow.

Figure 11:
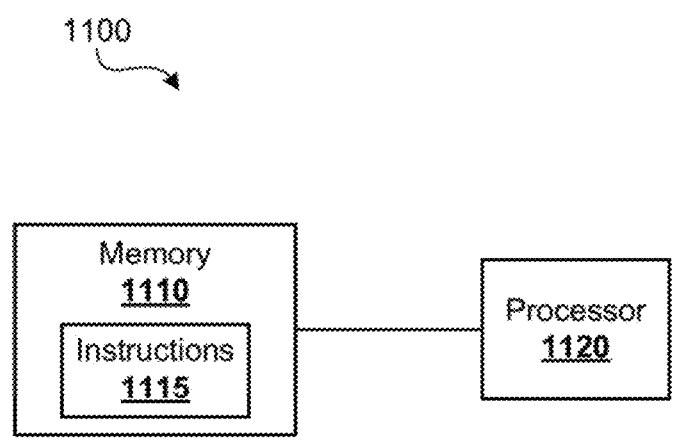
FIG. 11 is a block diagram of a system for creating a test case for a client in accordance with an example of the present technology.

Referring to FIG. 11, a system 1100 and/or method cats be implemented using a memory 1110, processor 1120, and/or computer readable medium. For example, an article of manufacture can include a memory or computer usable storage medium having computer readable program code or instructions 1115 embodied therein for validating an object and comprising computer readable program code capable of performing the operations of the methods described. In another example, the memory can include portable memory containing installation files from which software can be installed or remote memory from which installation filed can be downloaded. Also, program instructions stored in the memory can be embodied in installation files or installed files.

In some examples, the test case development tool can be integrated with a test, automation framework, such as a framework based on Ruby, Fixture, or Watir. The test case development tool can be used to read and analyze database schema, including database schema xml-based files. The test case development tool can analyze HTML files to identify objects. In one example, web pages can be converted into HTML files before analysis and identification of objects. Output XML files can include contexts for the test cases, including identified objects and related properties and behaviors, coordinates of each object in the container, execution sequences, database schema information, and so forth. The test case development tool can also be used to check grammar, spelling and other issues in a test case.

The methods and systems of certain examples may be implemented in hardware, software, firmware, or combinations thereof. In one example, the method can be executed by software or firmware that is stored in a memory and that is executed by a suitable instruction execution system. If implemented in hardware, as in an alternative example, the method can be implemented with any suitable technology that is well known in the art.

Also within the scope of an example is the implementation of as program or code that can be stored in a non-transitory machine-readable medium to permit a computer to perform any of the methods described above. For example, implementation can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain program instruction and data for use by or in connection with the instruction execution system such as a processor. Computer readable media can comprise any one of many physical media such as, for example, electronic, magnetic, optical, electromagnetic, or semiconductor media. More specific examples of suitable computer-readable media include, but are not limited to, a magnetic computer diskette such as floppy diskettes or hard drives, a random access memory (RAM), a read-only memory (ROM), an erasable programmable read-only memory, or a portable device such as a compact disc (CD), thumb drive, or as digital video disc (DVD).

Various techniques, or certain aspects or portions thereof, may take the form of program code (i.e., instructions) embodied in tangible media, such as floppy diskettes, CD-ROMs, DVDs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI circuits or gate arrays, off-the-shelf semiconductors such as logic chips, transistors, or other discrete components. A module ma also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as to single data set, or may be distributed over different locations including over different storage devices. The modules may be passive or active, including agents operable to perform desired functions.

The modules can also be a combination of hardware and software. In an example configuration, the hardware can be a processor and memory while the software can be instructions stored in the memory. While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A processor implemented method, comprising:
  identifying a plurality of objects included in an application using a parser module;
  receiving a user selection of an object from the plurality of objects, the user selection of the object comprising a first user input to drag and drop the object into a test case development window;
  in response to receiving the user selection of the object, displaying a list of potential test case tasks associated with the object in a test case task window;

receiving a second user input placing a desired task of the list of potential test case tasks in the test case development window;

building a test case flow using the object and the desired task in the test case development window; and generating a test case from the test case flow, wherein generating the test case comprises generating a test case document containing hyper text markup language (HTML) commands for the application based on the desired task.

2. A method as in claim 1, wherein the second user input placing the desired task in the test case development window comprises dragging and dropping the desired task from the test case task window into the test case development window.

3. A method as in claim 1, wherein the test case document is an HTML document.

4. A method as in claim 1, wherein the test case document is an extensible markup language (XML) document.

5. A method as in claim 1, wherein the desired task comprises a plurality of tasks, at least one of the tasks being assignable to the object.

6. A method as in claim 5, further comprising assigning an input value to at least one of the plurality of tasks for input into the application for the test case.

7. A method as in claim 5, further comprising assigning a data manipulation to at least one of the plurality of tasks to manipulate data in a database used by the application.

8. A method as in claim 1, further comprising identifying a database used by the application, reading a schema of the database, and analyzing a table definition and any links to another table within the database.

9. A method as in claim 8, further comprising displaying a hierarchical graphical display of database elements in a user interface for use in building the test case flow.

10. A method as in claim 1, further comprising selectively displaying a preview of the test case before generating the test case from the test case flow to enable a user to preview the test case and identify potential issues before the test case is generated.

11. A non-transitory computer readable medium having program instructions thereon that when executed by a processor, cause the processor to:

identify a plurality of objects in an application;

receive a user selection of an object from the plurality of objects, the user selection of the object comprising a first user input to drag and drop the object into a test case development window;

in response to the received user selection of the object, display a plurality of tasks associated with the object in a test case task window;

receive a second user input placing a desired task from the plurality of tasks in the test case development window;

build a test case flow using the object and the desired task in the test case development window; and generate the test case from the test case flow, wherein the test case comprises a test case document containing hyper text markup language (HTML) commands for the application based on the desired task.

12. A medium as in claim 11, wherein the program instructions, when executed by the processor, function as an HTML module and an extensible markup language (XML) module, the HTML module being operable to generate the test case document in an HTML format, and the XML module being operable to generate the test case document in an XML format.

13. A medium as in claim 11, wherein the program instructions when executed by the processor function as a database analysis module operable to identify a database used by the application, read a schema of the database, and analyze a table definition and any links to another table within the database, the database analysis module being operable to display a hierarchical graphical display of database elements in a user interface for use in building the test case flow.

14. A medium as in claim 11, wherein the program instructions when executed by the processor function as a preview module which, when selected by a user, is operable to display a preview of the test case before generating the test case from the test case flow to enable the user to preview the test case and identify potential issues before the test case is generated.

15. A system comprising:

a processor; and a memory, the memory including program instructions that, when executed by the processor, cause the processor to:

identify a plurality of objects included in an application using a parser module;

receive a user selection of an object from the plurality of objects, the user selection of the object comprising a first user input to drag and drop the object into a test case development window;

in response to the user selection of the object, display a list of potential test case tasks associated with the object in a test case task window;

receive a second user input placing a desired task from the list of potential test case tasks in the test case development window;

build a test case flow using the desired task and the object in the test case development window; and generate the test case from the test case flow, wherein the test case comprises a test case document containing hyper text markup language (HTML) commands for the application based on the desired task.

16. The system of claim 15, wherein the second user input placing the desired task in the test case development window comprises a user input to drag and drop the desired task from the test case task window into the test case development window.

17. The system of claim 15, wherein the test case document is a hyper text markup language (HTML) test case document.

18. The system of claim 15, wherein the test case document is an extensible markup language (XML).

19. The system of claim 15, wherein the desired task comprises a plurality of tasks, at least one of the tasks being assignable to the object.

20. The medium of claim 11, wherein the second user input placing the desired task in the test case development window comprises a user input to drag and drop the desired task from the test case task window into the test case development window.

* * * * *